(12) United States Patent
Miyazawa

(10) Patent No.: US 12,170,845 B2
(45) Date of Patent: Dec. 17, 2024

(54) IMAGING DEVICE, IMAGE PROCESSING METHOD, AND PROGRAM

(71) Applicant: SONY GROUP CORPORATION, Tokyo (JP)

(72) Inventor: Ryota Miyazawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 105 days.

(21) Appl. No.: 17/921,495

(22) PCT Filed: May 19, 2021

(86) PCT No.: PCT/JP2021/018917
§ 371 (c)(1),
(2) Date: Oct. 26, 2022

(87) PCT Pub. No.: WO2021/246171
PCT Pub. Date: Dec. 9, 2021

(65) Prior Publication Data
US 2023/0164436 A1     May 25, 2023

(30) Foreign Application Priority Data

Jun. 4, 2020 (JP) ................................ 2020-097742

(51) Int. Cl.
*H04N 23/67*     (2023.01)
*G03B 17/18*     (2021.01)
(Continued)

(52) U.S. Cl.
CPC ............... *H04N 23/67* (2023.01); *G06F 3/14* (2013.01); *G06T 5/20* (2013.01); *G06V 10/751* (2022.01);
(Continued)

(58) Field of Classification Search
CPC ... G06F 3/14; G06T 5/20; G06T 2207/10024; G06V 10/751; G06V 10/764;
(Continued)

(56) References Cited

U.S. PATENT DOCUMENTS 7,538,803 B2 * 5/2009 Kurosawa ............... H04N 5/262
348/239
10,613,416 B2 * 4/2020 Wakazono ................ G06T 1/20
(Continued)

FOREIGN PATENT DOCUMENTS

JP     2005-114858 A     4/2005
JP     2009-272784 A     11/2009
(Continued)

*Primary Examiner* — Marly S Camargo
(74) *Attorney, Agent, or Firm* — Paratus Law Group, PLLC

(57) ABSTRACT

To provide a device and a method of analyzing a change in the degree of focusing between a current image and a past image and outputting display data capable of identifying a change in the degree of focusing to a display unit. A focusing-degree change analysis unit that analyzes a change in a degree of focusing between a current image output from an image sensor and a past image output from the image sensor before the current image is output and a display control unit that generates display data enabling checking of a focusing-degree change state from the past image in units of pixel regions of the current image by using an analysis result of the focusing-degree change analysis unit are provided. Pixel classification information indicating which of (a) pixel approaching focusing, (b) pixel out of focusing, and (c) pixel with no change in the degree of focusing each pixel corresponds to is generated and output in units of pixels.

16 Claims, 12 Drawing Sheets

(51) Int. Cl.
*G06F 3/14* (2006.01)
*G06T 5/20* (2006.01)
*G06V 10/75* (2022.01)
*G06V 10/764* (2022.01)
*H04N 23/63* (2023.01)

(52) U.S. Cl.
CPC .. *G06V 10/764* (2022.01); *G06T 2207/10024* (2013.01)

(58) Field of Classification Search
CPC .... H04N 23/67; H04N 23/632; H04N 23/633; H04N 23/635; H04N 23/673; G03B 17/18
See application file for complete search history.

(56) References Cited

U.S. PATENT DOCUMENTS

| | | | |
|---|---|---|---|
| 12,013,525 B2* | 6/2024 | Matsumura | G02B 21/36 |
| 2009/0175554 A1* | 7/2009 | Matsushita | G03B 17/18 |
| | | | 382/255 |
| 2018/0152617 A1* | 5/2018 | Miyake | H04N 23/675 |
| 2022/0148149 A1* | 5/2022 | Matsumoto | H04N 23/67 |
| 2022/0269062 A1* | 8/2022 | Matsumura | G02B 21/365 |
| 2023/0087663 A1* | 3/2023 | Araki | G06T 15/20 |
| 2023/0328372 A1* | 10/2023 | Fu | G06T 7/80 |
| 2024/0221139 A1* | 7/2024 | Miyazawa | G06T 5/70 |

FOREIGN PATENT DOCUMENTS

| | | |
|---|---|---|
| JP | 2010-219741 A | 9/2010 |
| JP | 2016-024489 A | 2/2016 |
| WO | WO 2016/163324 A1 | 10/2016 |

* cited by examiner

FIG. 3

| PIXEL CLASSIFICATION | DEFINITION | SPECIFIC CRITERIA FOR DETERMINATION |
|---|---|---|
| (CLASSIFICATION 1) | PIXEL APPROACHING FOCUSING | PIXEL IN WHICH DEGREE OF FOCUSING OF CURRENT IMAGE IS HIGHER THAN THAT OF PAST IMAGE BY THRESHOLD OR MORE |
| (CLASSIFICATION 2) | PIXEL OUT OF FOCUSING | PIXEL IN WHICH DEGREE OF FOCUSING OF CURRENT IMAGE IS LOWER THAN THAT OF PAST IMAGE BY THRESHOLD OR MORE |
| (CLASSIFICATION 3) | PIXEL WITH NO CHANGE IN DEGREE OF FOCUSING | PIXEL IN WHICH CHANGE IN DEGREE OF FOCUSING BETWEEN PAST IMAGE AND CURRENT IMAGE IS LESS THAN THRESHOLD |

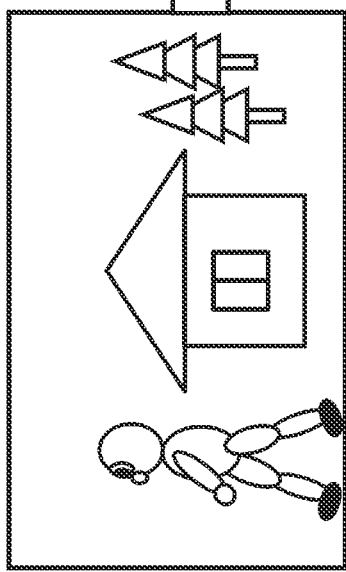
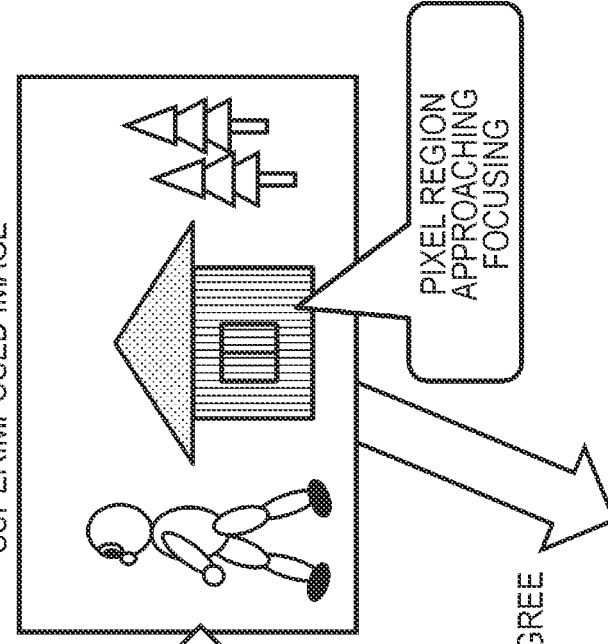
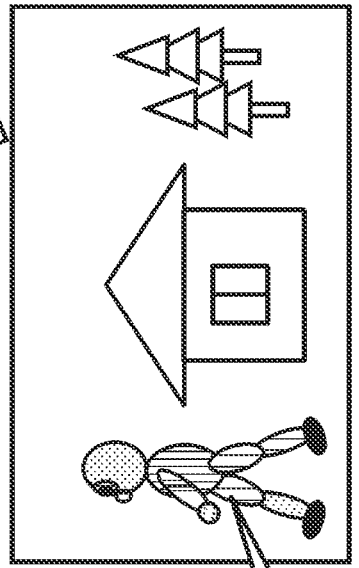
FIG. 4

FIG. 5
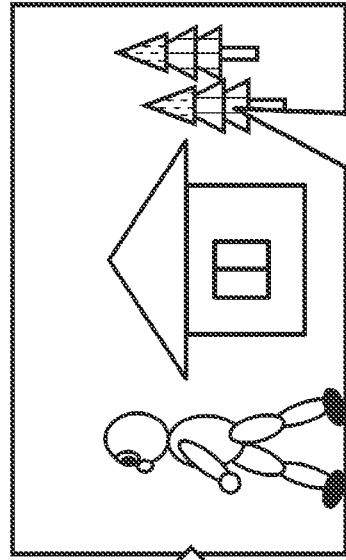
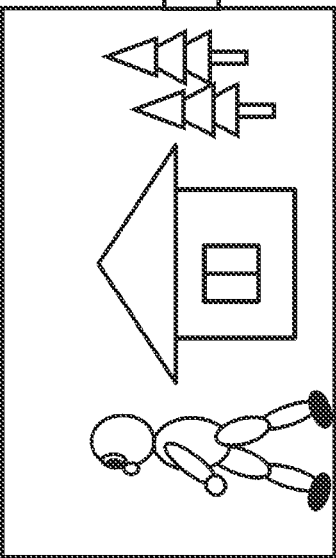
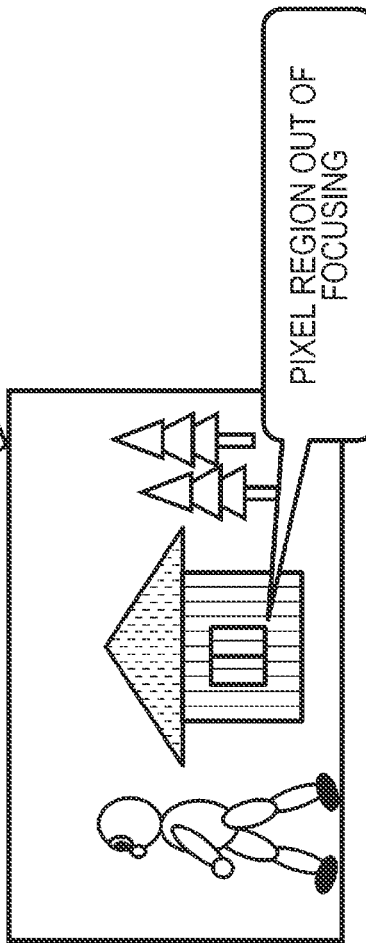

FIG. 6
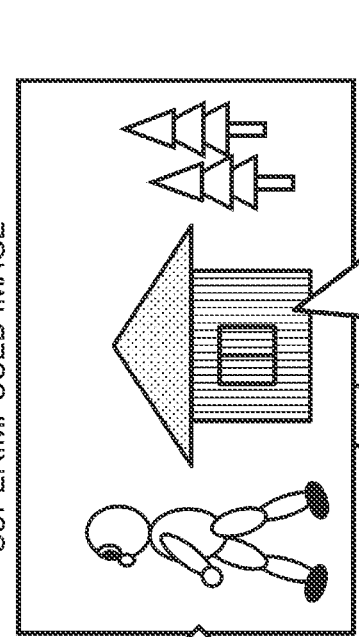
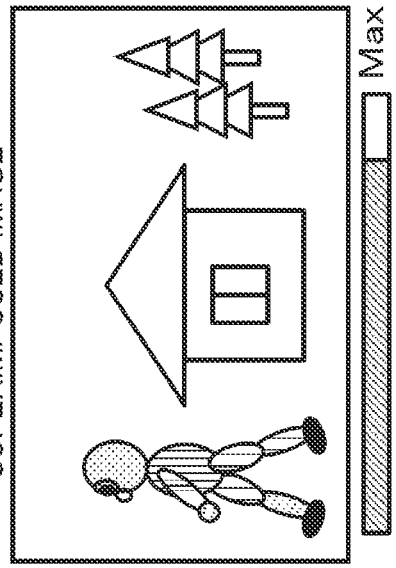

FIG. 10
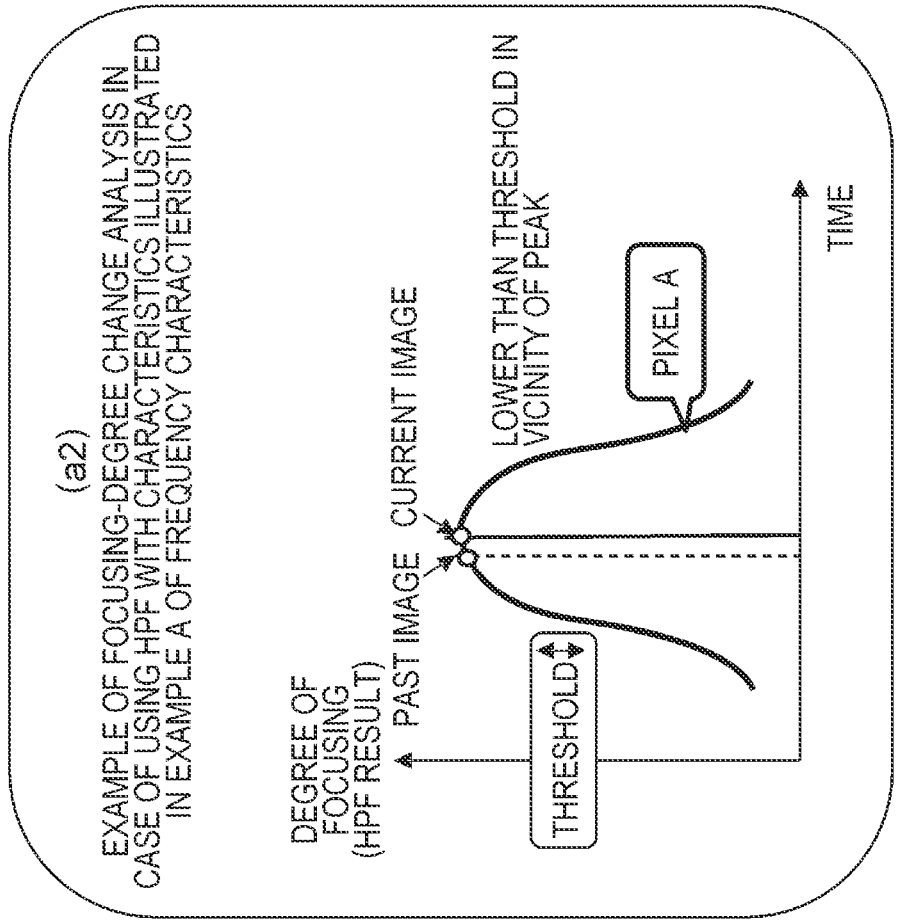
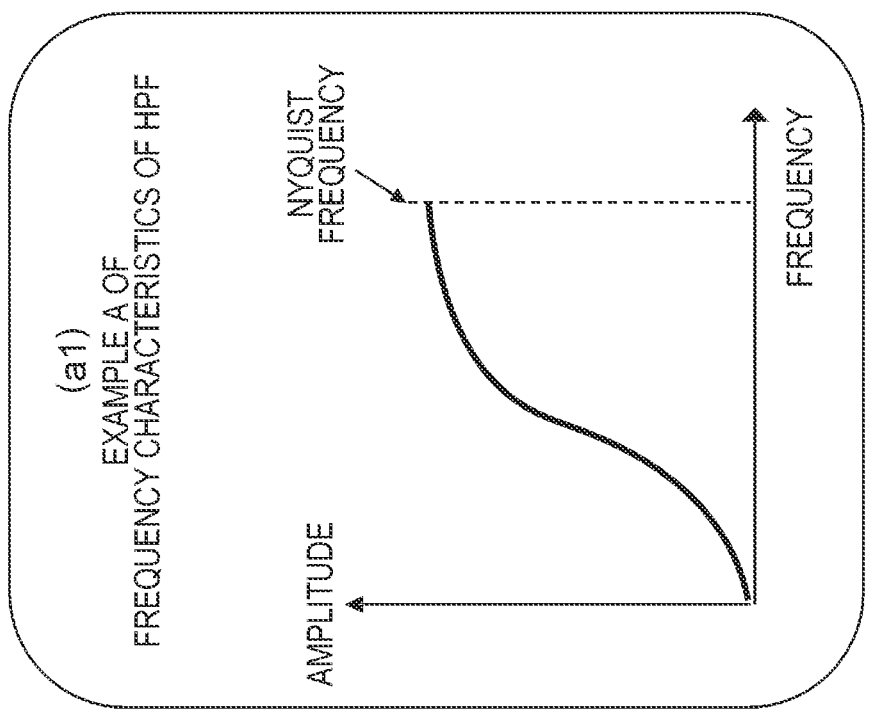

FIG. 11
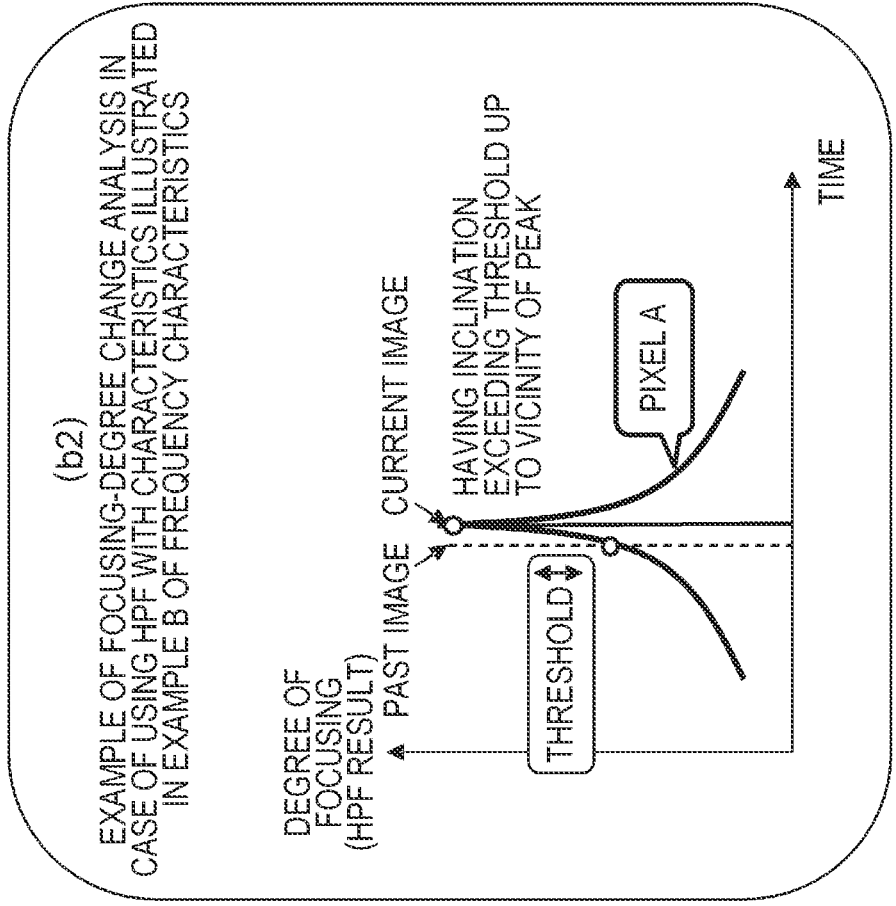
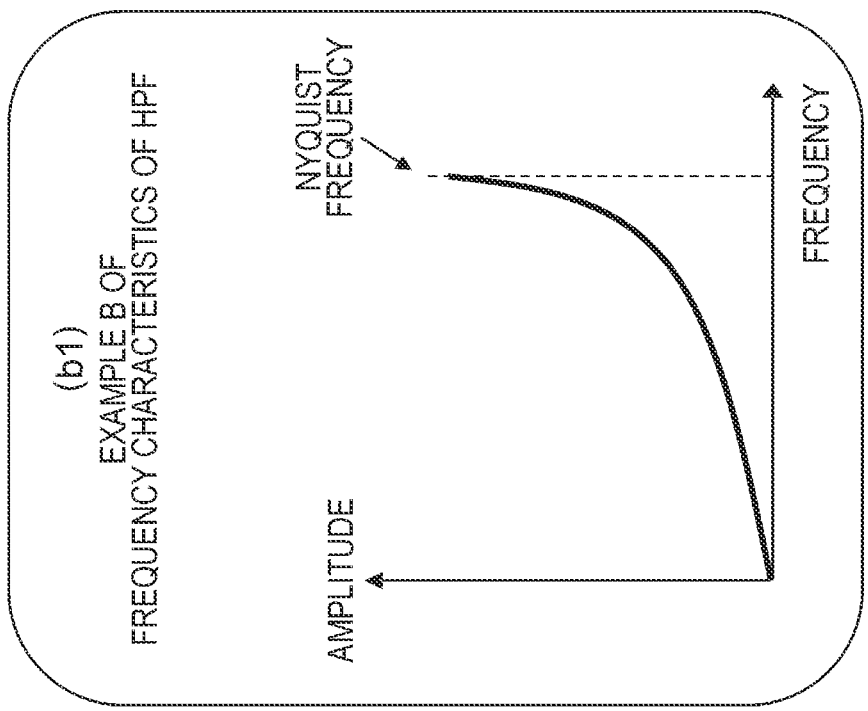

IMAGING DEVICE, IMAGE PROCESSING METHOD, AND PROGRAM

CROSS REFERENCE TO PRIOR APPLICATION

This application is a National Stage Patent Application of PCT International Patent Application No. PCT/JP2021/018917 (filed on May 19, 2021) under 35 U.S.C. § 371, which claims priority to Japanese Patent Application No. 2020-097742 (filed on Jun. 4, 2020), which are all hereby incorporated by reference in their entirety.

TECHNICAL FIELD

The present disclosure relates to an imaging device, an image processing method, and a program. More specifically, the present disclosure relates to an imaging device, an image processing method, and a program capable of generating and displaying information that enables checking of a focused state when a focus adjustment process is performed.

BACKGROUND ART

In a case where an image is captured by an imaging device (a camera), it is necessary to perform a focus adjustment process, that is, a focusing process on a specific subject to be captured. In recent years, cameras with an autofocus function are often used, but many cameras used by professional photographers and the like have a configuration that enables manual focus adjustment.

In particular, many high-definition imaging devices with advanced features are capable of manual focus adjustment. A photographer, who is a user, views an image (a through image) of a viewfinder or a monitor, checks a change in the resolution level of the image, and determines whether or not optimum focus adjustment has been performed on a target subject.

However, there is a problem that it is difficult for a photographer to recognize a difference in a sense of resolution due to a difference in a focus position with a small view finder or monitor, and thus it is difficult to perform accurate focusing.

This is because a display unit such as a viewfinder or a monitor often has a smaller number of pixels than an imaging element (an image sensor), and an image sufficiently representing a change in a sense of resolution cannot be output to the display unit such as a viewfinder or a monitor.

As a result, it is difficult for the user (the photographer) to identify a subtle difference in focus level.

For example, Patent Document 1 (WO 2016/163324 A) and Patent Document 2 (Japanese Patent Application Laid-Open No 2009-272784) have been proposed as conventional techniques that disclose a method of solving such a problem.

Patent Document 1 (WO 2016/163324 A) discloses a configuration in which a peaking signal generated by applying a HPF or the like to an output image of an imaging element (an image sensor), that is, a peaking signal for identifying a region with a high degree of focusing in the image is superimposed and displayed on a display image of a display unit such as a viewfinder or a monitor.

The number of high-frequency signals increases in the region with a high degree of focusing, and thus it is possible to select the region with a high degree of focusing by using a HPF filtered image. For example, by superimposing and displaying a peaking signal such as a red signal on the region with a high degree of focusing, the user can determine a focused region.

In addition, Patent Document 2 (Japanese Patent Application Laid-Open No. 2009-272784) discloses a configuration in which the level of the degree of focusing is determined in accordance with a ratio of a high-frequency component included in a through image, and a bar-shaped focusing level display unit indicating the determined result by a length of a bar is displayed together with the through image.

However, the peaking signal disclosed in Patent Document 1 is superimposed and displayed not on an object to be focused but on the entire through image, and is continued to be superimposed even after focus adjustment is completed. Therefore, there is a problem that an object to be captured is difficult to be viewed. In addition, the configuration of displaying a bar disclosed in Patent Document 2 has a problem that if there is a subject originally having a high-frequency component in a focus detection region, the level of the degree of focusing increases due to the presence of such a subject, and the degree of focusing of the subject on which the user really wants to focus may not be reflected in the bar-shaped focusing level display unit.

CITATION LIST

Patent Documents

Patent Document 1: WO 2016/163324 A
Patent Document 2: Japanese Patent Application Laid-Open No. 2009-272784

SUMMARY OF THE INVENTION

Problems to be Solved by the Invention

The present disclosure has been made in view of the above problems, for example, and an object of the present disclosure is to provide an imaging device, an image processing method, and a program capable of generating and displaying information that enables checking of a focused state in units of predetermined pixel regions.

Solutions to Problems

A first aspect of the present disclosure is an imaging device including:
- a focusing-degree change analysis unit that analyzes a change in a degree of focusing between a current image output from an image sensor and a past image output from the image sensor before the current image is output;
- a display control unit that generates display data enabling checking of a focused state from the past image in units of pixel regions of the current image by using an analysis result of the focusing-degree change analysis unit; and
- a display unit that displays the display data.

In addition, a second aspect of the present disclosure is an image processing method performed in an image processing apparatus, the image processing method including:
- a focusing-degree change analysis step that causes a focusing-degree change analysis unit to analyze a change in a degree of focusing between a current image output from an image sensor and a past image output from the image sensor before the current image is output;

a display control step that causes a display control unit to generate display data enabling checking of a focused state from the past image in units of pixel regions of the current image by using an analysis result of the focusing-degree change analysis unit; and a display step that causes a display unit to display the display data.

Furthermore, a third aspect of the present disclosure is a program that causes an image processing apparatus to perform image processing, the program including:

a focusing-degree change analysis step that causes a focusing-degree change analysis unit to analyze a change in a degree of focusing between a current image output from an image sensor and a past image output from the image sensor before the current image is output;

a display control step that causes a display control unit to generate display data enabling checking of a focused state from the past image in units of pixel regions of the current image by using an analysis result of the focusing-degree change analysis unit; and a display step that causes a display unit to display the display data.

Note that the program according to the present disclosure is, for example, a program that can be provided in a computer-readable format to an information processing apparatus or a computer system capable of performing various program codes by a storage medium or a communication medium. By providing such a program in a computer-readable format, processing based on the program is implemented on the information processing apparatus or the computer system.

Still other objects, features, and advantages of the present disclosure will become apparent from more detailed description based on embodiments of the present disclosure to be described later and the accompanying drawings. Note that in the present specification, a system is a logical set configuration of a plurality of devices, and is not limited to a system in which devices with the individual configurations are in the same housing.

According to a configuration of an embodiment of the present disclosure, a device and a method of analyzing a change in the degree of focusing between a current image and a past image and outputting display data capable of identifying a change in the degree of focusing to a display unit are implemented.

Specifically, for example, a focusing-degree change analysis unit that analyzes a change in a degree of focusing between a current image output from an image sensor and a past image output from the image sensor before the current image is output and a display control unit that generates display data enabling checking of a focusing-degree change state from the past image in units of pixel regions of the current image by using an analysis result of the focusing-degree change analysis unit are provided. Pixel classification information indicating which of (a) pixel approaching focusing, (b) pixel out of focusing, and (c) pixel with no change in a degree of focusing each pixel corresponds to is generated and output in units of pixels.

With this configuration, the device and the method of analyzing a change in the degree of focusing between the current image and the past image and outputting display data capable of identifying a change in the degree of focusing to the display unit are implemented.

Note that the effects described in the present specification are merely examples and are not limited, and additional effects may be obtained.

BRIEF DESCRIPTION OF DRAWINGS

FIG. 3 is a diagram for explaining pixel classification information.

FIG. 4 is a diagram for explaining an example of display data.

FIG. 5 is a diagram for explaining an example of the display data.

FIG. 6 is a diagram for explaining an example of the display data.

FIG. 10 is a diagram for explaining a specific example of characteristics of a HPF and an example of a focusing-degree change analysis.

FIG. 11 is a diagram for explaining a specific example of the characteristics of the HPF and an example of the focusing-degree change analysis.

MODE FOR CARRYING OUT THE INVENTION

Hereinafter, details of an imaging device, an image processing method, and a program according to the present disclosure will be described with reference to the drawings. Note that the description will be made according to the following items.

1. Configuration Example of Imaging Device According to Present Disclosure
2. Detailed Configuration and Specific Example of Processing of Focusing-Degree Change Analysis Unit
3. Specific Example of Display Data
4. Specific Examples of Processing of Analyzing Change in Degree of Focusing in Units of Pixels and Pixel Classification Processing
5. (Second Embodiment) Embodiment of Focusing-Degree Change Analysis Unit Performing Pixel Classification Using Averaged Data in Units of Plurality of Pixel Regions
6. Characteristics of Optimal HPF Used in Focusing-Degree Change Analysis Unit
7. (Third Embodiment) Embodiment in Which Down-Conversion Processing Based on Number of Pixels of Display Unit is Performed
8. Summary of Configuration of Present Disclosure

1. Configuration Example of Imaging Device According to Present Disclosure

First, a configuration example of an imaging device according to the present disclosure will be described.

Figure 1:
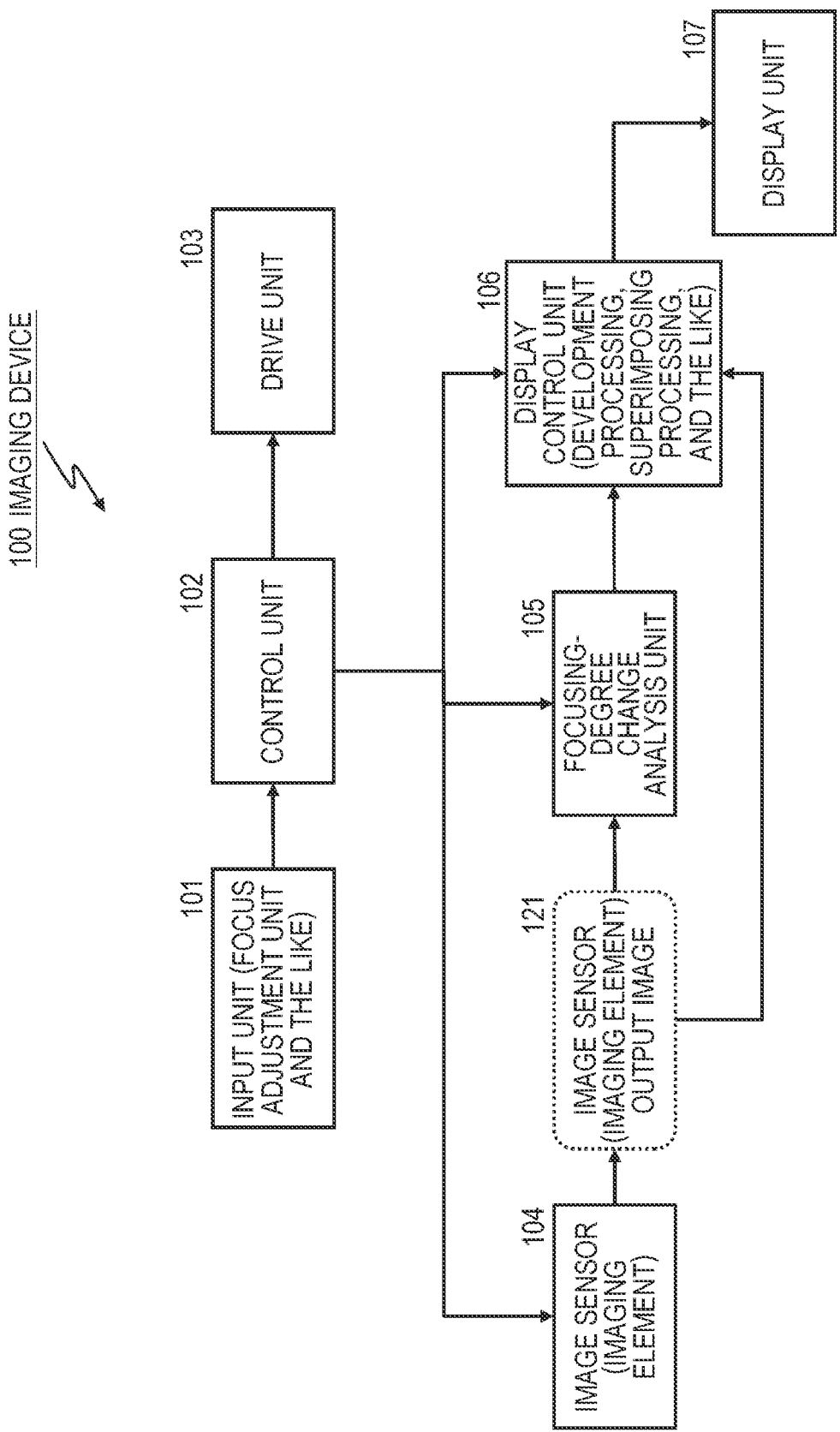
FIG. 1 is a diagram for explaining a configuration example of an imaging device according to the present disclosure.

FIG. 1 is a block diagram illustrating a main configuration of an imaging device 100 according to the present disclosure.

As illustrated in FIG. 1, the imaging device 100 includes an input unit 101, a control unit 102, a drive unit 103, an image sensor (an imaging element) 104, a focusing-degree change analysis unit 105, a display control unit 106, and a display unit 107.

Note that FIG. 1 is a diagram illustrating only the main configuration used for the processing of the present disclosure in the configuration of the imaging device 100. The imaging device 100 includes various components such as a lens and a storage unit in addition to the configuration illustrated in FIG. 1.

The input unit 101 corresponds to a user's operation unit, and is an input unit for performing, for example, a shutter, focus adjustment, and various other operations and settings.

The control unit 102 executes control of various types of processing performed in the imaging device 100. The control unit 102 includes, for example, a processor or the like that performs processing in accordance with a program stored in a storage unit (not illustrated).

The drive unit 103 performs driving processing based on a user operation on the input unit 101, for example. For example, lens driving processing for focus adjustment or the like is performed.

The image sensor (the imaging element) 104 is an image sensor for generating a subject image input via a lens (not illustrated). For example, the image sensor includes a CMOS, a CCD, or the like.

An output of the image sensor (the imaging element) 104 is an image sensor (an imaging element) output image 121 illustrated in FIG. 1.

The image sensor (the imaging element) output image 121 is input to the focusing-degree change analysis unit 105.

The focusing-degree change analysis unit 105 analyzes the temporal change in the degree of focusing, for example, in units of pixels or in units of a predetermined number of pixel regions.

Details of the configuration and processing of the focusing-degree change analysis unit 105 will be described later. For example, analysis processing is performed in which the current image sensor output image and the past image sensor output image one to several frames before are compared, and each pixel of the current image sensor output image is classified as any one of the following pixels.

(1) Pixel approaching focusing
(2) Pixel out of focusing
(3) Pixel with no change in the degree of focusing The details of the configuration and processing of the focusing-degree change analysis unit 105 will be described later.

The display control unit 106 performs development processing of displaying the image sensor (the imaging element) output image 121 on the display unit 107, processing of generating pixel-basis focusing-degree change information for indicating a focusing-degree change state based on pixel classification information output from the focusing-degree change analysis unit 105, processing of superimposing the generated pixel-basis focusing-degree change information on a developed image of the image sensor (the imaging element) output image 121, and the like, and generates a display image to be output to the display unit 107.

The display unit 107 is a display unit that displays a display image generated by the display control unit 106, and includes, for example, a monitor or a viewfinder. Specifically, the display unit is, for example, a display unit such as an LCD.

2. Detailed Configuration and Specific Example of Processing of Focusing-Degree Change Analysis Unit Next, a detailed configuration and a specific example of processing of a focusing-degree change analysis unit will be described.

That is, a detailed configuration and a specific example of processing of the focusing-degree change analysis unit 105, which is a component of the imaging device 100 illustrated in FIG. 1, will be described.

Figure 2:
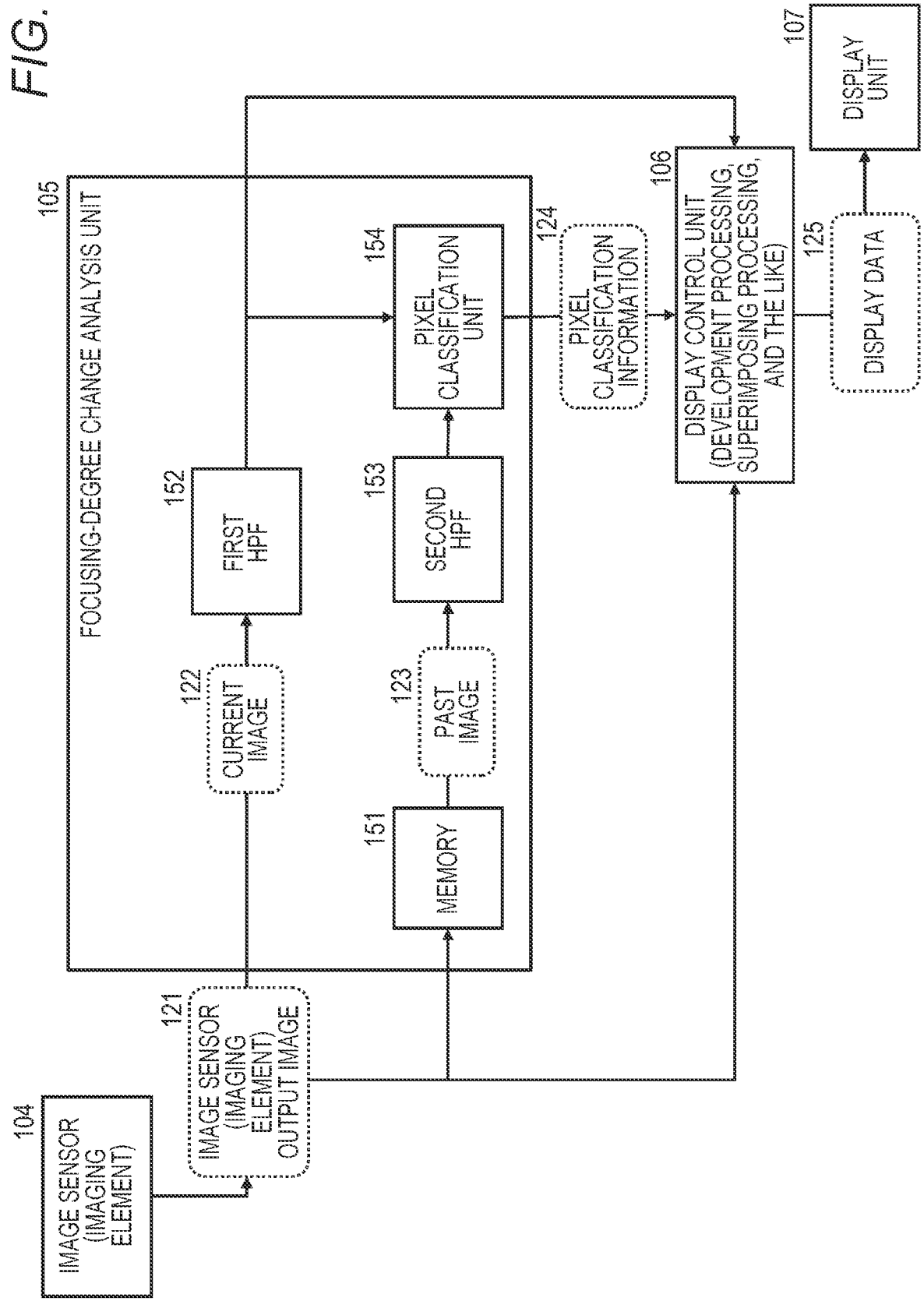
FIG. 2 is a diagram for explaining a configuration example of a focusing-degree change analysis unit.

FIG. 2 is a block diagram illustrating an example (a first embodiment) of the detailed configuration of the focusing-degree change analysis unit 105, which is a component of the imaging device 100 illustrated in FIG. 1.

As illustrated in FIG. 2, the focusing-degree change analysis unit 105 of the first embodiment includes a memory 151, a first high pass filter (HPF) 152, a second high pass filter (HPF) 153, and a pixel classification unit 154.

The image sensor output image 121, which is the output of the image sensor (the imaging element) 104, is input to the first HPF 152 of the focusing-degree change analysis unit 105 and is also stored in the memory 151.

The latest image sensor output image 121, that is, a current image 122 is input to the first HPF 152, and the first HPF 152 performs filtering processing using a HPF on the current image 122.

Generally, a pixel region with a high degree of focusing has many high frequencies, whereas a pixel region with a low degree of focusing has few high frequencies and many low-frequency signals. Therefore, by performing the filtering processing using the HPF, a HPF filtered image in which a region with a high degree of focusing and a region with a low degree of focusing in the current image 122 can be identified can be generated. The HPF filtered image is, for example, an image in which a signal (a pixel value) based on the degree of focusing (the amount of a high-frequency component) is set.

The first HPF 152 generates a current image HPF filtered image, and inputs the generated current image HPF filtered image to the pixel classification unit 154.

The memory 151 is an image frame memory, and is a memory capable of storing one image frame to several image frames.

The image sensor output image 121, which is the output of the image sensor (the imaging element) 104, is sequentially input and stored in the memory 151. A past image 123 one image frame to several image frames before the current image 122 is read from the memory 151 and input to the second HPF 153.

The past image 123 one image frame to several image frames before the current image 122 is input to the second HPF 153, and the filtering processing using the HPF is performed on the past image 123.

The second HPF 153 generates a HPF filtered image in which a region with a high degree of focusing and a region with a low degree of focusing in the past image 123 can be identified by the filtering processing using the HPF, and inputs the generated past image HPF filtered image to the pixel classification unit 154.

The pixel classification unit 154 inputs the following two HPF filtered images.

(1) HPF filtered image for current image 122
(2) HPF filtered image for past image 123

The pixel classification unit 154 compares these two HPF filtered images and classifies each pixel of the current image as any one of the following pixels.

(1) Pixel approaching focusing
(2) Pixel out of focusing
(3) Pixel with no change in the degree of focusing The pixel classification unit 154 compares the high-frequency signal components of the corresponding pixel regions of the current image HPF filtered image and the past image HPF filtered image.

As described above, if the amount of the high-frequency component is large, it can be determined that the degree of focusing is high.

If the high-frequency component signal of the current image rises from the high-frequency component signal of the past image and the amount of rise is equal to or more than a predetermined threshold, the pixel classification unit 154 determines that the pixel is "pixel approaching focusing".

In addition, if the high-frequency component signal of the current image decreases from the high-frequency component signal of the past image and the amount of decrease is equal to or more than a predetermined threshold, the pixel classification unit 154 determines that the pixel is "pixel out of focusing".

Furthermore, if the difference between the high-frequency component signal of the current image and the high-frequency component signal of the past image is less than a predetermined threshold, it is determined that the pixel is "pixel with no change in the degree of focusing".

As described above, the pixel classification unit 154 analyzes the change in the high-frequency component signal in units of the corresponding pixels of the current image HPF filtered image and the past image HPF filtered image, analyzes pixel classification information in units of pixels, that is, which of the following three types of pixel classifications each pixel corresponds to by using the analysis result as an index value indicating the state of change in the degree of focusing, and outputs the analysis result to the display control unit 106 as pixel classification information 124.

(1) Pixel approaching focusing
(2) Pixel out of focusing
(3) Pixel with no change in the degree of focusing As described above, the pixel classification unit 154 performs pixel classification on the basis of the difference between the high-frequency component signal of the current image and the high-frequency component signal of the past image. Therefore, for example, even in a pixel region with many high-frequency components such as signal components of the original image, for example, a texture region, in a case where the amount of change in the high-frequency component is small in accordance with the focus adjustment, a pixel is determined as the pixel with no change in the degree of focusing. That is, by applying the processing of the present disclosure, it is possible to display focused state check data that does not interfere with manual focus.

FIG. 3 is a diagram for explaining the pixel classification information 124 generated by the pixel classification unit 154.

As illustrated in FIG. 3, the pixel classification information 124 includes:

(Classification 1) Pixel approaching focusing
(Classification 2) Pixel out of focusing
(Classification 3) Pixel with no change in the degree of focusing, and each pixel is classified into the above three types.

As illustrated in FIG. 3, (Classification 1) The pixel approaching focusing is a pixel in which the degree of focusing of the current image is higher than that of the past image by a threshold or more.

(Classification 2) The pixel out of focusing is a pixel in which the degree of focusing of the current image is lower than that of the past image by a threshold or more.

(Classification 3) The pixel with no change in the degree of focusing is a pixel in which the change in the degree of focusing between the past image and the current image is less than a threshold.

The pixel classification information 124 generated by the pixel classification unit 154 is output to the display control unit 106.

The display control unit 106 performs development processing of displaying the image sensor (the imaging element) output image 121 on the display unit 107, processing of generating pixel-basis focusing-degree change information for indicating a focusing-degree change state based on pixel classification information output from the focusing-degree change analysis unit 105, processing of superimposing the generated pixel-basis focusing-degree change information on a developed image of the image sensor (the imaging element) output image 121, and the like, and generates the display data 125 to be output to the display unit 107.

The display unit 107 displays the display data 125 generated by the display control unit 106.

3. Specific Example of Display Data

Next, a specific example of display data will be described.

An example of the display data 125 generated by the display control unit 106 will be described with reference to FIG. 4.

FIG. 4 illustrates an example of transition of images displayed on the display unit 107 in the process of focus adjustment by a user (a photographer).

FIG. 4(1) illustrates a through image, that is, an image after development processing on the image sensor (the imaging element) output image 121.

The user (the photographer) starts focus adjustment while viewing the through image.

When the user (the photographer) starts focus adjustment, the pixel classification unit 154 classifies the individual pixels in the image into the following three types.

(Classification 1) Pixel approaching focusing
(Classification 2) Pixel out of focusing
(Classification 3) Pixel with no change in the degree of focusing The pixel classification information 124 is input to the display control unit 106, and the display control unit 106 generates the display data 125 using the classification information.

The example illustrated in FIG. 4 is an example of generation of display data in which only "(classification 1) pixel approaching focusing" is selected, and "(classification 1) pixel approaching focusing" can be identified.

By the user (the photographer) performing focus adjustment, for example, display data illustrated in FIG. 4(2a) is generated and displayed on the display unit 107. The pixel-basis focusing-degree change information superimposed image in FIG. 4(2a) is display data obtained by superimposing a focusing-degree change determination signal (a peaking signal) for enabling identification of "(classification 1) pixel approaching focusing", for example, a specific color signal (for example, a red signal) on an image of "house" in the image.

By viewing the display data, the user (the photographer) can check that the region of "house" in the image is approaching focusing.

Furthermore, by the user (the photographer) performing focus adjustment, the display data transitions from the display data illustrated in FIG. 4(2a) to the display data illustrated in FIG. 4(2b).

The pixel-basis focusing-degree change information superimposed image in FIG. 4(2b) is display data obtained by superimposing a focusing-degree change determination signal (a peaking signal) for enabling identification of "(classification 1) pixel approaching focusing", for example, a specific color signal (for example, a red signal) on an image of "person" in the image.

By viewing the display data, the user (the photographer) can check that the region of "person" in the image is approaching focusing. In this way, it is easy to check the degree of focusing only in the "person" region.

As described above, by applying the processing of the present disclosure, it is possible to easily and reliably check which pixel region in the image is approaching focusing.

Note that, since the focusing determination signal is not displayed in regions except for a region approaching focusing, there is an advantage that the through image is easily viewed.

Note that the example of the display data illustrated in FIG. 4 is a simple explanatory diagram for comprehensively explaining the processing of the present disclosure. In practice, there is a low possibility that the focusing-degree change determination signal is displayed in units of houses or persons, and the focusing-degree change determination signal (the peaking signal) is displayed in finer units such as parts of a house or a person.

Note that the example illustrated in FIG. 4 is an example of display data on which the focusing-degree change determination signal enabling identification of only "(classification 1) pixel approaching focusing" is superimposed. However, for example, the display control unit 106 can also generate display data on which the focusing-degree change determination signal enabling identification of only "(classification 2) pixel out of focusing" is superimposed, and display the generated display data on the display unit 107.

FIG. 5 illustrates an example of generation of display data in which only "(classification 2) pixel out of focusing" is selected, and "(classification 2) pixel out of focusing" can be identified.

FIG. 5(1) illustrates a through image, that is, an image after development processing on the image sensor (the imaging element) output image 121.

The user (the photographer) starts focus adjustment while viewing the through image.

By the user (the photographer) performing focus adjustment, for example, display data illustrated in FIG. (2a) is generated and displayed on the display unit 107.

The pixel-basis focusing-degree change information superimposed image in FIG. 5(2a) is display data obtained by superimposing a focusing-degree change determination signal for enabling identification of "(classification 2) pixel out of focusing", for example, a specific color signal (for example, a blue signal) on an image of "tree" in the image.

By viewing the display data, the user (the photographer) can check that the region of "tree" in the image is out of focusing.

Furthermore, by the user (the photographer) performing focus adjustment, the display data transitions from the display data illustrated in FIG. 452a) to the display data illustrated in FIG. 4(2b).

The pixel-basis focusing-degree change information superimposed image in FIG. 4(2b) is display data obtained by superimposing a focusing-degree change determination signal for enabling identification of "(classification 2) pixel out of focusing", for example, a specific color signal (for example, a blue signal) on an image of "house" in the image.

By viewing the display data, the user (the photographer) can check that the region of "house" in the image is out of focusing.

As described above, by applying the processing of the present disclosure, it is possible to easily and reliably check which pixel region in the image is out of focusing.

Note that FIG. 4 illustrates an example of image data enabling identification of a pixel region of only "(classification 1) pixel approaching focusing", and FIG. 5 illustrates an example of image data enabling identification of a pixel region of only "(classification 2) pixel out of focusing". However, in addition to these pieces of image data, the display control unit 106 can also generate image data enabling identification of only "(classification 3) pixel with no change in the degree of focusing".

Furthermore, the display control unit 106 can also generate display data enabling identification of all or two of the following three types of pixels.

(Classification 1) Pixel approaching focusing
(Classification 2) Pixel out of focusing
(Classification 3) Pixel with no change in the degree of focusing For example it may be configured to generate display data in which a red focusing-degree change determination signal is superimposed on "(classification 1) pixel approaching focusing",
a blue focusing-degree change determination signal is superimposed on "(classification 2) pixel out of focusing", and
a yellow focusing-degree change determination signal is superimposed on "(classification 3) pixel with no change in the degree of focusing", and display the generated display data on the display unit 107.

By viewing the display data displayed on the display unit 107, the user (the photographer) can easily and reliably check the mode of change in the degree of focusing in each pixel region in the image.

Furthermore, for example, the display control unit 106 may be configured to generate data in which the degree of focusing of the pixel region approaching focusing is displayed using a bar indicator, and output the data to the display unit 107.

FIG. 6 illustrates a specific example.

In FIGS. 6(2b) and (2c), the region of "person" in an image is the region of "(classification 1) pixel approaching focusing".

For example, as illustrated in FIGS. 6(2a) and (2b), a bar indicator indicating the degree of focusing is displayed on the lower side of the image.

This bar indicator is a level indicator of the degree of focusing indicating the level of the degree of focusing in the region of "(classification 1) pixel approaching focusing" by the length of the bar.

The length of the bar in FIG. 6(2c) is longer than that in (2b), and the user (the photographer) can correctly recognize that the degree of focusing in the pixel region of "person", which is the region of "(classification 1) pixel approaching focusing", gradually increases.

As described above, the focusing-degree change analysis unit 105 of the imaging device 100 according to the present disclosure analyzes the change in the degree of focusing in units of pixels, and classifies each pixel into the following three types of pixels on the basis of the analysis result.

(Classification 1) Pixel approaching focusing
(Classification 2) Pixel out of focusing
(Classification 3) Pixel with no change in the degree of focusing Furthermore, the display control unit 106 generates display data enabling recognition of the mode of change in the degree of focusing of each pixel using the classification result, and displays the generated display data on the display unit 107.

By performing these processes, the user (the photographer) views the image displayed on the display unit 107, and can accurately and easily identify the change in the degree of focusing of each pixel.

4. Specific Examples of Processing of Analyzing Change in Degree of Focusing in Units of Pixels and Pixel Classification Processing Next, specific examples of processing of analyzing a change in the degree of focusing in units of pixels and pixel classification processing will be described.

As described above, the focusing-degree change analysis unit 105 analyzes the temporal change in the degree of focusing, for example, in units of pixels or in units of a predetermined number of pixel regions.

For example, the current image sensor output image and the past image sensor output image one to several frames before are compared, and each pixel of the current image sensor output image is classified as any one of the following pixels.

(Classification 1) Pixel approaching focusing
(Classification 2) Pixel out of focusing
(Classification 3) Pixel with no change in the degree of focusing As described above with reference to FIGS. 2 and 3, the pixel classification unit 154 of the focusing-degree change analysis unit 105 compares the two HPF filtered images, that is, the current image HPF filtered image and the past image HPF filtered image, and analyzes which of (classification 1) to (classification 3) each pixel of the current image corresponds to.

A specific example of the pixel analysis processing performed by the pixel classification unit 154 of the focusing-degree change analysis unit 105 will be described with reference to FIG. 7.

Figure 7:
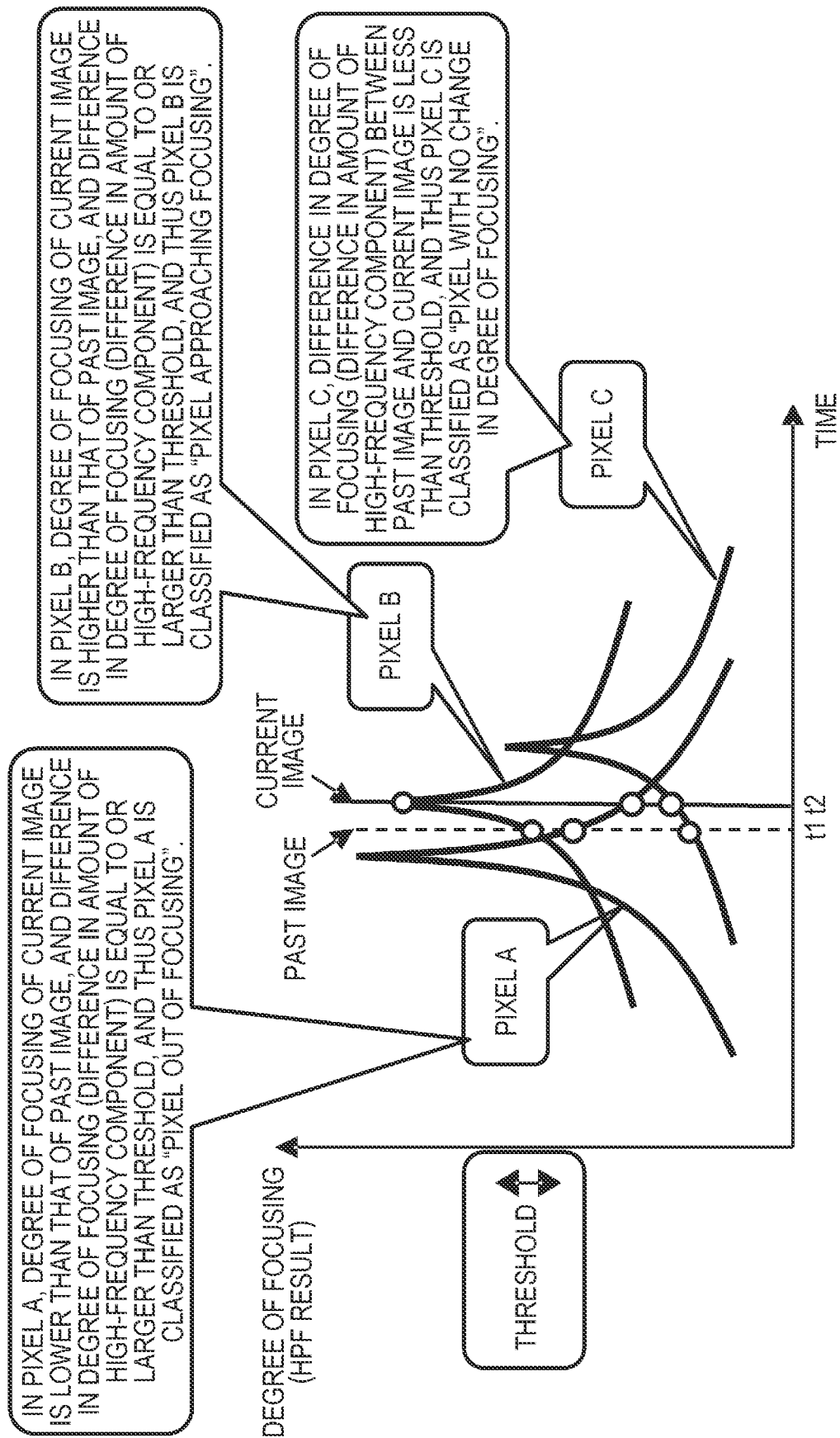
FIG. 7 is a diagram for explaining a specific example of pixel analysis processing performed by a pixel classification unit of the focusing-degree change analysis unit.

The graph illustrated in FIG. 7 is a graph showing the time on the horizontal axis and the degree of focusing (a HPF result) on the vertical axis.

The captured image at a time t1 corresponds to a past image, and the captured image at a time t2 corresponds to a current image.

The filtering processing using a HPF is performed on the past image, which is the captured image at the time t1, by the second HPF 153 illustrated in FIG. 2 and the amount of a high-frequency component of each pixel is calculated.

On the other hand, the filtering processing using a HPF is performed on the current image, which is the captured image at the time t2, by the first HPF 152 illustrated in FIG. 2 and the amount of the high-frequency component of each pixel is calculated.

The pixel classification unit 154 compares these two HPF filtered images, that is, the current image HPF filtered image and the past image HPF filtered image, and analyzes which of (classification 1) to (classification 3) each pixel of the current image corresponds to.

For example, in a pixel A illustrated in FIG. 7, the degree of focusing of the current image is lower than that of the past image, and the difference in the degree of focusing (the difference in the amount of the high-frequency component) is equal to or larger than a threshold, and thus the pixel A is classified as "pixel out of focusing".

Furthermore, in a pixel B, the degree of focusing of the current image is higher than that of the past image, and the difference in the degree of focusing (the difference in the amount of the high-frequency component) is equal to or larger than the threshold, and thus the pixel B is classified as "pixel approaching focusing".

Further, in a pixel C, the difference in the degree of focusing (the difference in the amount of the high-frequency component) between the past image and the current image is less than the threshold, and thus the pixel C is classified as "pixel with no change in the degree of focusing".

As described above, the pixel classification unit 154 calculates the difference in the degree of focusing (=the difference in the amount of the high-frequency component) between corresponding pixels of these two HPF filtered images, that is, the current image HPF filtered image and the past image HPF filtered image, compares the calculated difference with a predetermined threshold, and determines which of (classification 1) to (classification 3) each pixel of the current image corresponds to.

Note that the processing of analyzing the change in the degree of focusing in the focusing-degree change analysis unit 105 is repeatedly performed on the images continuously input from the image sensor (the imaging element) 104.

That is, the processing of generating the latest classification result of the latest input image is repeatedly performed on each new input image.

Figure 8:
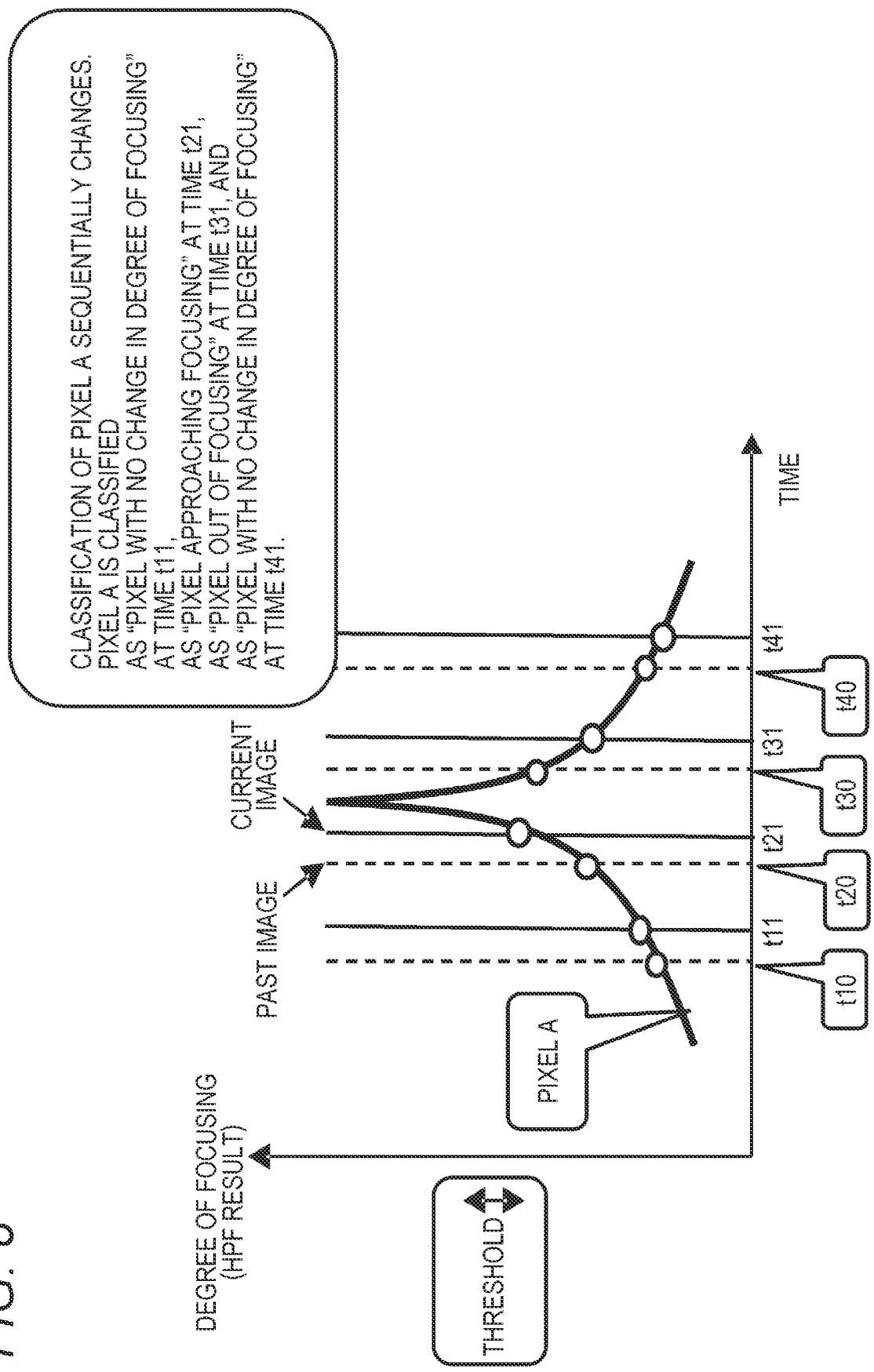
FIG. 8 is a diagram for explaining a specific example of the pixel analysis processing performed by the pixel classification unit of the focusing-degree change analysis unit.

FIG. 8 is a graph showing a change in the degree of focusing of one pixel, that is, "pixel A" while a user (a photographer) continuously performs focus adjustment.

Similarly to FIG. 7, the graph illustrated in FIG. 8 is a graph showing the time on the horizontal axis and the degree of focusing (a HPF result) on the vertical axis.

At each of times t11, t21, t31, and t41, the focusing-degree change analysis unit 105 compares the degree of focusing (=the amount of the high-frequency component) of the corresponding pixel with that of the past image at each of times t10, t20, t30, and t40, which is an image captured immediately before each of the times t11, t21, t31, and t41, analyzes the mode of the change in the degree of focusing of the pixel A in the latest captured image, and performs pixel classification processing based on the analysis result.

At the time t11, the difference in the degree of focusing (the difference in the amount of the high-frequency component) between the past image (the captured image at t10) and the current image (the captured image at t11) is less than the threshold, and thus the pixel A is classified as "pixel with no change in the degree of focusing".

At the next time t21, the degree of focusing of the current image (the captured image at t21) is higher than that of the past image (the captured image at t20) and the difference in the degree of focusing (the difference in the amount of the high-frequency component) is equal to or larger than the threshold, and thus the pixel A is classified as "pixel approaching focusing".

At the next time t31, the degree of focusing of the current image (the captured image at t31) is lower than that of the past image (the captured image at t30) and the difference in the degree of focusing (the difference in the amount of the high-frequency component) is equal to or larger than the threshold, and thus the pixel A is classified as "pixel out of focusing".

At the next time t41, the difference in the degree of focusing (the difference in the amount of the high-frequency component) between the past image (the captured image at t40) and the current image (the captured image at t41) is less than the threshold, and thus the pixel A is classified as "pixel with no change in the degree of focusing".

As described above, the processing of analyzing the change in the degree of focusing in the focusing-degree change analysis unit 105 is repeatedly performed on the images continuously input from the image sensor (the imaging element) 104.

The display control unit 106 sequentially updates display data in accordance with the latest pixel classification information input from the focusing-degree change analysis unit 105, generates new display data, and outputs the generated display data to the display unit 107.

As a result, the user (the photographer) can easily and reliably grasp the change in the degree of focusing of each subject due to the focus adjustment performed by the user.

For example, in a case where a certain pixel region is classified into "pixel approaching focusing" at a certain timing, display data on which a red focusing-degree change determination signal is superimposed is displayed. Furthermore, in a case where the pixel is classified into "pixel out of focusing" at a later timing, display data on which a blue focusing-degree change determination signal is superimposed is displayed.

The user (the photographer) can determine that the switching point of the color of the superimposed signal, that is, the point at which the color to be superimposed changes from red to blue is the focusing point, and can easily and reliably perform focus adjustment.

5. (Second Embodiment) Embodiment of Focusing-Degree Change Analysis Unit Performing Pixel Classification Using Averaged Data in Units of Plurality of Pixel Regions Next, as a second embodiment, an embodiment of a focusing-degree change analysis unit performing pixel classification using averaged data in units of a plurality of pixel regions will be described.

The focusing-degree change analysis unit 105 described above with reference to FIG. 2 is configured to perform processing of classifying each pixel as any one of the following pixels on a pixel basis in the pixel classification unit 154.

(Classification 1) Pixel approaching focusing
(Classification 2) Pixel out of focusing
(Classification 3) Pixel with no change in the degree of focusing However, in a case where there is a noise or a shake in a captured image, an error occurs in the result of the analysis processing in units of pixels, and accurate classification processing may not be performed.

In order to solve such a problem, the configuration of performing pixel classification using averaged data in units of a plurality of pixel regions is effective.

Figure 9:
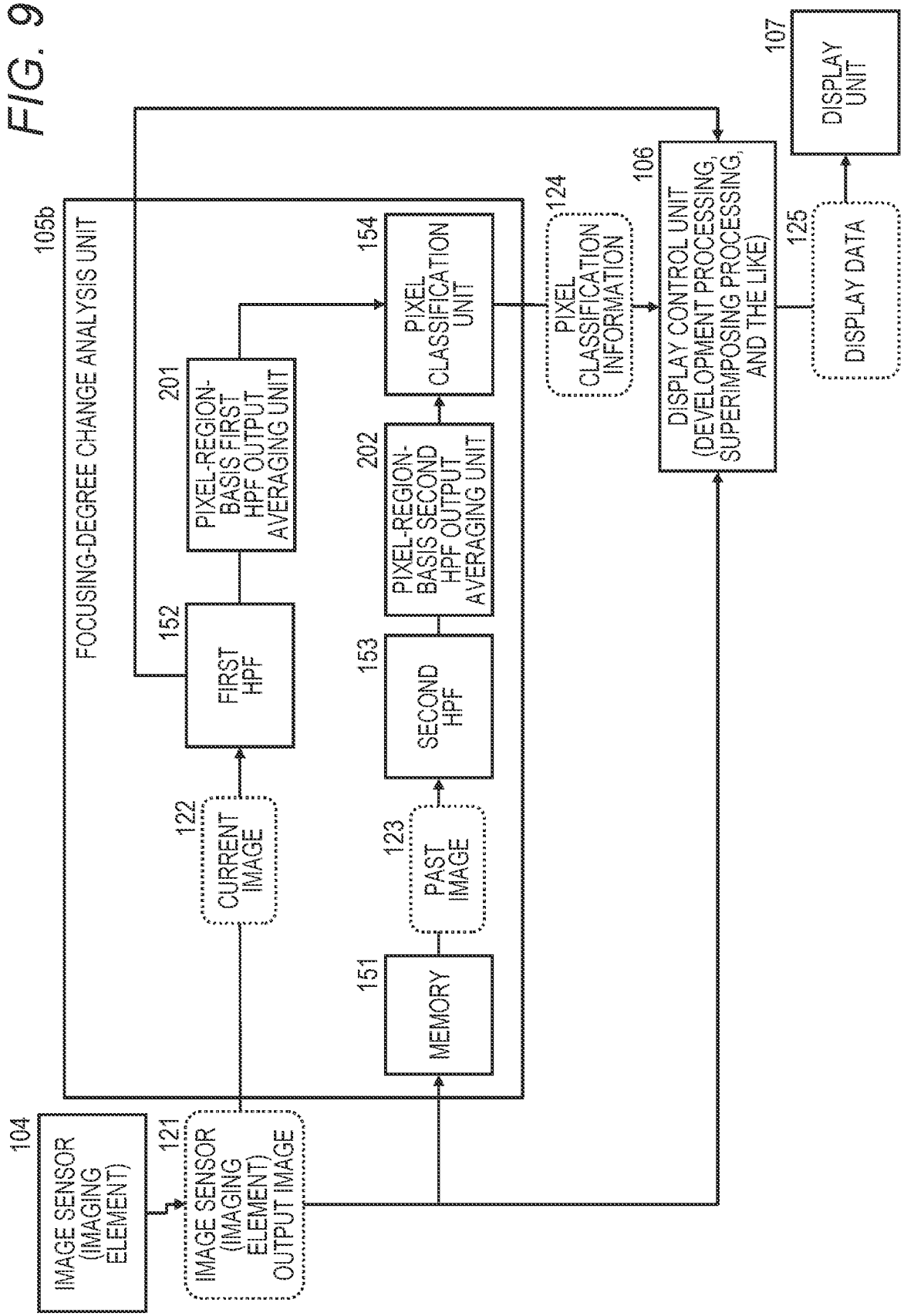
FIG. 9 is a diagram for explaining a configuration example of a focusing-degree change analysis unit according to a second embodiment.

FIG. 9 is a block diagram illustrating a configuration example of a focusing-degree change analysis unit 105b of a second embodiment.

That is, it is a block diagram illustrating a configuration example of the focusing-degree change analysis unit 105b that performs pixel classification using averaged data in units of a plurality of pixel regions.

The focusing-degree change analysis unit 105b illustrated in FIG. 9 has a configuration in which a pixel-region-basis first HPF output averaging unit 201 and a pixel-region-basis second HPF output averaging unit 202 are added to the focusing-degree change analysis unit 105 described above with reference to FIG. 2.

The pixel-region-basis first HPF output averaging unit 201 performs averaging processing using pixel values of surrounding pixels on each pixel value of a current image HPF filtered image output from the preceding first HPF 152. For example, for one pixel of a HPF filtered image, an averaged pixel value of pixel values in a 9×9 pixel region around the pixel is calculated and set as a pixel value (a HPF filtering result) of the one pixel.

Similarly, the pixel-region-basis second HPE output averaging unit 202 performs averaging processing using pixel values of surrounding pixels on each pixel value of a past image HPF filtered image output from the preceding second HPF 153. For example, for one pixel of a HPF filtered image, an averaged pixel value of pixel values in a 9×9 pixel region around the pixel is calculated and set as a pixel value (a HPF filtering result) of the one pixel.

As described above, by performing the processing of averaging the pixel values of the constituent pixels of the HPF filtered image, the noise and shake of each pixel are reduced, and a classification error can be reduced.

For example, even if one pixel on the upper, lower, left, or right side of a certain pixel shakes, the values of 8×8 pixels do not change, and thus the influence on the average value is small. At the same time, the random noise is also reduced by averaging with many pixels. In addition, instead of a simple average, a weighted average may be performed in such a manner that the weight increases toward the center pixel. By performing such processing, the influence of distant pixels can be reduced.

6. Characteristics of Optimal HPF Used in Focusing-Degree Change Analysis Unit Next, characteristics of an optimal HPF used in a focusing-degree change analysis unit will be described.

As described above with reference to FIG. 2, the first HPF 152 inputs the latest image sensor output image 121, that is, the current image 122, performs the filtering processing using a HPF on the current image 122, and generates a HPF filtered image corresponding to the current image 122.

In addition, the second HPF 153 inputs the past image 123 one image frame to several image frames before the current image 122, performs the filtering processing using the HPF on the past image 123, and generates a HPF filtered image corresponding to the past image 123.

Generally, a pixel region with a high degree of focusing has many high frequencies, whereas a pixel region with a low degree of focusing has few high frequencies and many low-frequency signals. Therefore, by performing the filtering processing using the HPF, a HPF filtered image in which the region with a high degree of focusing and the region with a low degree of focusing can be identified can be generated.

However, for example, a certain pixel needs to be determined as "pixel approaching focusing" until the pixel reaches the focusing point, and thus the frequency characteristics of the HPF needs to be devised.

Although only the high-frequency component in the vicinity of the Nyquist frequency increases in the vicinity of the focusing point, generally, the high-frequency component in the vicinity of the Nyquist frequency and its change tend to decrease due to the influence of a lens and an optical LPF. Note that the Nyquist frequency is a frequency corresponding to ½ of a sampling frequency.

In order to determine a pixel as "pixel approaching focusing" even if there is such a tendency, it is preferable to use a HPF with characteristics that the amplitude characteristic increases acceleratively as the frequency approaches a high-frequency side. That is, it is preferable to use a HPF with characteristics that the filtering result of the HPF has a large inclination up to the peak.

A specific example of the characteristics of the HPF and an example of a focusing-degree change analysis will be described with reference to the drawings.

FIG. 10 illustrates the following drawings.
(a1) Example A of frequency characteristics of HPF
(a2) Example of focusing-degree change analysis in case of using HPF with characteristics illustrated in example A of frequency characteristics The graph illustrated in (a1) example A of frequency characteristics of HPF is a graph showing the frequency characteristics of a HPF, in which horizontal axis=frequency and vertical axis=amplitude.

The HPF characteristics shown in this graph are characteristics in which a change in the frequency decreases as the frequency approaches the vicinity of the Nyquist frequency.

The graph of (a2) on the right side shows the result of the focusing-degree change analysis in a case where the HPF with such characteristics is used as the first HPF 152 or the second HPF 153 in the focusing-degree change analysis unit 105 of the imaging device according to the present disclosure.

As described above with reference to FIGS. 7 and 8, the graph of (a2) is a graph showing the time on the horizontal axis and the degree of focusing (a HPF result) on the vertical axis.

The degree of focusing (the HPF result) on the vertical axis corresponds to the detected amount of a high-frequency component in a HPF filtering result image.

Here, if the HPF characteristics are characteristics in which the change in the frequency decreases in the vicinity of the Nyquist frequency as in (a1) example A of frequency characteristics of HPF, as a result, as illustrated in (a2), the change in the degree of focusing (=the change in the detected high-frequency component) decreases in the vicinity of the peak of the degree of focusing.

In such a case, the difference in the degree of focusing between the current image and the past image is smaller than a predetermined threshold, and as a result, there is a possibility that a pixel is determined as a pixel with no change in the degree of focusing although the pixel is a pixel approaching focusing.

In order to determine a pixel as "pixel approaching focusing" at a position where the degree of focusing reaches a peak without causing such a problem, it is preferable to use a HPF with characteristics that the amplitude characteristic increases acceleratively as the frequency approaches the high-frequency side. That is, it is preferable to use a HPF with characteristics that the filtering result of the HPF has a large inclination up to the peak.

Specifically, it is preferable to use a HPF with characteristics illustrated in FIG. 11(b1).

FIG. 11 illustrates the following drawings.
(b1) Example B of frequency characteristics of HPF
(b2) Example of focusing-degree change analysis in case of using HPF with characteristics illustrated in example B of frequency characteristics The graph illustrated in (b1) example B of frequency characteristics of HPE is a graph showing the frequency characteristics of a HPF, in which horizontal axis=frequency and vertical axis=amplitude.

The HPF characteristics shown in this graph are characteristics in which a change in the frequency increases as the frequency approaches the vicinity of the Nyquist frequency.

The graph of (b2) on the right side shows the result of the focusing-degree change analysis in a case where the HPF with such characteristics is used as the first HPF 152 or the second HPF 153 in the focusing-degree change analysis unit 105 of the imaging device according to the present disclosure.

Similarly to the graph illustrated in FIG. 10(a2), the graph of (b2) is a graph showing the time on the horizontal axis and the degree of focusing (a HPF result) on the vertical axis.

The degree of focusing (the HPF result) on the vertical axis corresponds to the detected amount of a high-frequency component in a HPF filtering result image.

Here, if the HPF characteristics are characteristics in which the change in the frequency increases in the vicinity of the Nyquist frequency as in (b1) example B of frequency characteristics of HPF, as a result, as illustrated in (b2), the change in the degree of focusing (=the change in the detected high-frequency component) increases in the vicinity of the peak of the degree of focusing.

As described above, if a large amount of change in the degree of focusing (=the amount of change in a detected high-frequency component) can be detected in the vicinity of the peak of the degree of focusing, the difference in the degree of focusing between the current image and the past image is larger than the predetermined threshold, and as a result, even in the vicinity of the peak of the degree in focusing, a pixel can be determined as "pixel approaching focusing".

As described above, the HPF used as the first HPF 152 or the second HPF 153 in the focusing-degree change analysis unit 105 of the imaging device according to the present disclosure is preferably a HPF with characteristics in which the amplitude characteristic increases acceleratively as the frequency approaches the high-frequency side.

7. (Third Embodiment) Embodiment in which Down-Conversion Processing Based on Number of Pixels of Display Unit is Performed Next, as a third embodiment, an embodiment in which down-conversion processing based on the number of pixels of a display unit is performed will be described.

Figure 12:
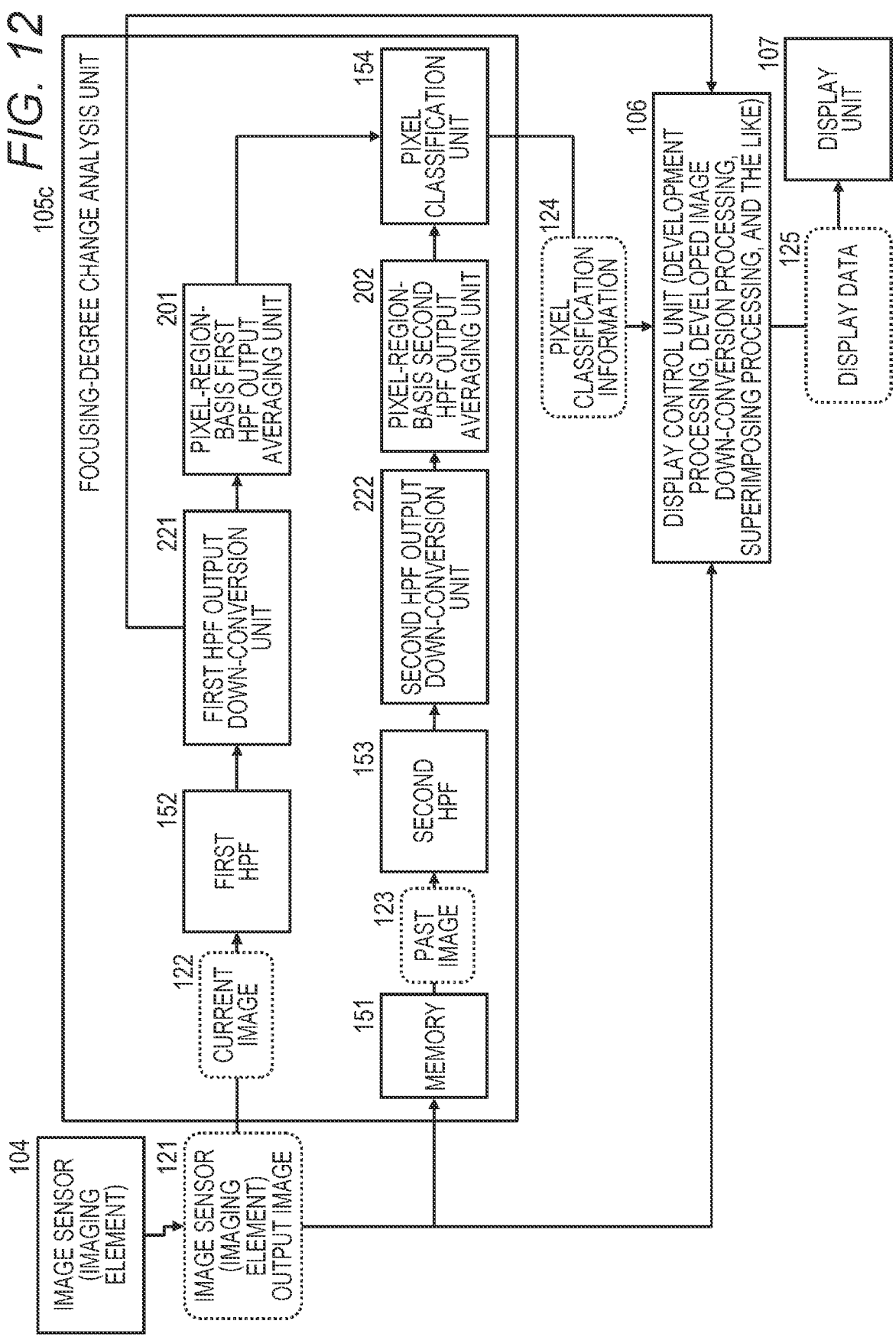
FIG. 12 is a diagram for explaining a configuration example of a focusing-degree change analysis unit according to a third embodiment.

FIG. 12 is a block diagram illustrating a configuration example of a focusing-degree change analysis unit 105b of a third embodiment.

That is, it is a block diagram illustrating a configuration example of the focusing-degree change analysis unit 105c that performs pixel classification using averaged data in units of a plurality of pixel regions.

In the configuration illustrated in FIG. 12, the number of pixels of the display unit 107 is smaller than the number of pixels of the image sensor (the imaging element) 104.

In this case, the image displayed on the display unit 107 needs to be an image obtained by reducing the number of pixels of the image sensor output image 121, which is the output of the image sensor (the imaging element) 104, that is, an image obtained by down-converting the image sensor output image 121.

The display control unit 106 in the configuration illustrated in FIG. 12 performs down-conversion processing on the image sensor output image 121.

As described above, in a case where the down-converted image of the image sensor output image 121 is displayed on the display unit 107, the pixel classification information 124 output from the focusing-degree change analysis unit 105c to the display control unit 106 also needs to be pixel classification information corresponding to the pixel position of the down-converted image.

The focusing-degree change analysis unit 105c illustrated in FIG. 12 has a configuration to implement this processing.

The focusing-degree change analysis unit 105c illustrated in FIG. 12 has a configuration in which a first HPF output down-conversion unit 221 and a second HPF output down-conversion unit 222 are added to the focusing-degree change analysis unit 105 described above with reference to FIG. 9 as the second embodiment.

As illustrated in FIG. 12, the first HPF output down-conversion unit 221 is configured between the first HPF 152 and the pixel-region-basis first HPF output averaging unit 201.

The first HPF output down-conversion unit 221 performs down-conversion processing on the current image HPF filtered image output from the first HPF 152. The down-conversion rate (the reduction rate of the number of pixels) of the down-conversion processing is similar to the down-conversion rate of the down-conversion processing performed on the image sensor output image 121 by the display control unit 106.

The first HPF output down-conversion unit 221 performs the down-conversion processing on the current image HPF filtered image generated by the first HPF 152, and generates a down-converted image of the current image HPF filtered image.

The down-converted image of the current image HPF filtered image generated by the first HPF output down-conversion unit 221 is input to the pixel-region-basis first HPF output averaging unit 201.

The pixel-region-basis first HPF output averaging unit 201 performs processing on the down-converted image of the current image HPF filtered image.

On the other hand, the second HPF output down-conversion unit 222 is configured between the second HPF 153 and the pixel-region-basis second HPF output averaging unit 202.

The second HPE output down-conversion unit 222 performs down-conversion processing on the past image HPF filtered image output from the second HPF 153. The down-conversion rate (the reduction rate of the number of pixels) of the down-conversion processing is also similar to the down-conversion rate of the down-conversion processing performed on the image sensor output image 121 by the display control unit 106.

The second HPF output down-conversion unit 222 performs the down-conversion processing on the past image HPF filtered image generated by the second HPF 153, and generates a down-converted image of the past image HPE filtered image.

The down-converted image of the past image HPF filtered image generated by the second HPF output down-conversion unit 222 is input to the pixel-region-basis second HPF output averaging unit 202.

The pixel-region-basis second HPF output averaging unit 202 performs processing on the down-converted image of the past image HPF filtered image.

The results of processing on the down-converted image of the current image HPF filtered image by the pixel-region-basis first HPF output averaging unit 201 and on the down-converted image of the past image HPE filtered image by the pixel-region-basis second HPF output averaging unit 202 are input to the pixel classification unit 154.

Both the results of processing are results for the down-converted image of the HPF filtered image, and the pixel classification unit 154 compares the results for the current image and the past image of the down-converted image of the HPF filtered image to perform pixel classification. The number of pixels to be subjected to the pixel classification matches the number of pixels of the down-converted image generated by the down-conversion processing performed on the image sensor output image 121 by the display control unit 106.

The display control unit 106 generates pixel-basis focusing-degree change information indicating a focusing-degree change state based on pixel classification information corresponding to the number of pixels of the down-converted image output from the focusing-degree change analysis unit 105c in the down-converted image generated by the down-conversion processing on the image sensor output image 121, and outputs the display data 125 including these pieces of data to the display unit 107.

Note that in the configuration of the focusing-degree change analysis unit 105c in FIG. 12, the first HPF output down-conversion unit 221 is set between the first HPF 152 and the pixel-region-basis first HPF output averaging unit 201, and the second HPF output down-conversion unit 222 is set between the second HPF 153 and the pixel-region-basis second HPF output averaging unit 202.

The down-conversion unit in the focusing-degree change analysis unit 105c can be set at various positions other than the position illustrated in FIG. 12 as long as the down-conversion unit is located at a position subsequent to the first HPF 152 and the second HPF 153.

In this way, by performing the down-conversion processing on the HPF filtered image in the focusing-degree change analysis unit, even if the image displayed on the display unit is the down-converted image of the image sensor output image 121, it is possible to output the focusing-degree change information corresponding to the down-converted image.

8. Summary of Configuration of Present Disclosure

Hereinabove, the embodiments of the present disclosure have been described in detail with reference to specific embodiments. However, it is obvious that those skilled in the art can make modifications and substitutions of the embodiments without departing from the gist of the present disclosure. That is, the present invention has been disclosed in the form of exemplification, and should not be interpreted in a limited manner. In order to determine the gist of the present disclosure, the claims should be taken into consideration.

Note that the technology disclosed in the present specification can have the following configurations.

(1) An imaging device including:
a focusing-degree change analysis unit that analyzes a change in a degree of focusing between a current image output from an image sensor and a past image output from the image sensor before the current image is output;
a display control unit that generates display data enabling checking of a focused state from the past image in units of pixel regions of the current image by using an analysis result of the focusing-degree change analysis unit; and
a display unit that displays the display data.

(2) The imaging device according to (1),
in which the display control unit
generates display data enabling checking of a degree of focusing of the current image and a focusing-degree change state from the past image to the current image.

(3) The imaging device according to (1) or (2),
in which the focusing-degree change analysis unit
generates pixel classification information indicating which of
(a) pixel approaching focusing,
(b) pixel out of focusing, and
(c) pixel with no change in a degree of focusing
each pixel corresponds to in units of pixels, and outputs the pixel classification information to the display control unit.

(4) The imaging device according to any one of (1) to (3),
in which the display control unit
generates display data enabling identification of at least one of a pixel approaching focusing, a pixel out of focusing, or a pixel with no change in a degree of focusing in units of pixels of the current image.

(5) The imaging device according to any one of (1) to (4),
in which the display control unit
generates display data in which a focusing-degree change determination signal enabling identification of at least one of a pixel approaching focusing, a pixel out of focusing, or a pixel with no change in a degree of focusing is superimposed on a through-image that is a developed image of an output of the image sensor.

(6) The imaging device according to (5), in which the focusing-degree change determination signal is a color signal that is different in accordance with a focusing-degree change state.

(7) The imaging device according to any one of (1) to (6),
in which the display control unit
generates display data including a bar indicator capable of determining a degree of focusing of a pixel approaching focusing.

(8) The imaging device according to any one of (1) to (7),
in which the focusing-degree change analysis unit
includes
a first filter unit that performs filtering processing on the current image and generates current image focusing-degree analysis data enabling identification of a degree of focusing in units of pixels,
a second filter unit that performs filtering processing on the past image and generates past image focusing-degree analysis data enabling identification of a degree of focusing in units of pixels, and
a pixel classification unit that compares the current image focusing-degree analysis data with the past image focusing-degree analysis data, analyzes a change in a degree of focusing in units of pixels or pixel regions, and generates pixel classification information on the basis of an analysis result.

(9) The imaging device according to (8),
in which the focusing-degree change analysis unit
includes a memory that stores an output image from the image sensor, and
the second filter unit inputs the past image from the memory and performs filtering processing on the past image.

(10) The imaging device according to (8) or (9),
in which the first filter unit and the second filter unit
perform filtering processing using a high pass filter (HPF).

(11) The imaging device according to (10),
in which a HPF used by the first filter unit and the second filter unit
has a characteristic that an amplitude characteristic increases acceleratively as a frequency approaches a high-frequency side.

(12) The imaging device according to any one of (8) to (11),
in which the focusing-degree change analysis unit includes
a first filter unit output averaging unit that averages an output of the first filter unit in units of a plurality of pixels, and
a second filter unit output averaging unit that averages an output of the second filter unit in units of a plurality of pixels, and
the pixel classification unit
includes a pixel classification unit that compares an output of the first filter unit output averaging unit with an output of the second filter unit output averaging unit, analyzes a change in a degree of focusing in units of pixels or pixel regions, and generates pixel classification information on the basis of an analysis result.

(13) The imaging device according to any one of (1) to (12),
in which the display control unit
is configured to output a down-converted image generated by down-converting an output image from the image sensor to the display unit, and
the focusing-degree change analysis unit
generates pixel classification information indicating a change in a degree of focusing in units of pixels of the down-converted image.

(14) The imaging device according to (13),
in which the focusing-degree change analysis unit includes
a first filter unit that performs filtering processing on the current image and generates current image focusing-degree analysis data enabling identification of a degree of focusing in units of pixels,
a second filter unit that performs filtering processing on the past image and generates past image focusing-degree analysis data enabling identification of a degree of focusing in units of pixels, and
a down-conversion unit that down-converts the current image focusing-degree analysis data and the past image focusing-degree analysis data.

(15) An image processing method performed in an image processing apparatus, the image processing method including:
a focusing-degree change analysis step that causes a focusing-degree change analysis unit to analyze a change in a degree of focusing between a current image output from an image sensor and a past image output from the image sensor before the current image is output;

a display control step that causes a display control unit to generate display data enabling checking of a focused state from the past image in units of pixel regions of the current image by using an analysis result of the focusing-degree change analysis unit; and a display step that causes a display unit to display the display data.

(16) A program that causes an image processing apparatus to perform image processing, the image processing comprising:

a focusing-degree change analysis step that causes a focusing-degree change analysis unit to analyze a change in a degree of focusing between a current image output from an image sensor and a past image output from the image sensor before the current image is output;

a display control step that causes a display control unit to generate display data enabling checking of a focused state from the past image in units of pixel regions of the current image by using an analysis result of the focusing-degree change analysis unit; and a display step that causes a display unit to display the display data.

Furthermore, the series of processing described in the specification can be performed by hardware, software, or a combined configuration of software and hardware. In the case of performing processing by software, a program having a processing sequence recorded therein can be installed and executed in a memory in a computer incorporated in dedicated hardware, or the program can be installed and executed in a general-purpose computer capable of executing various types of processing. For example, the program can be recorded in advance in a recording medium. In addition to installation from the recording medium to the computer, the program can be received via a network such as a local area network (LAN) or the Internet and installed in a recording medium such as a built-in hard disk.

Note that the various types of processing described in the specification may be performed not only in time series in accordance with the description but also in parallel or individually in accordance with the processing capability of the device that performs the processing or as necessary. Furthermore, in the present specification, a system is a logical set configuration of a plurality of devices, and is not limited to a system in which devices with the individual configurations are in the same housing.

INDUSTRIAL APPLICABILITY

As described above, according to a configuration of an embodiment of the present disclosure, a device and a method of analyzing a change in the degree of focusing between a current image and a past image and outputting display data capable of identifying a change in the degree of focusing to a display unit are implemented.

Specifically, for example, a focusing-degree change analysis unit that analyzes a change in a degree of focusing between a current image output from an image sensor and a past image output from the image sensor before the current image is output and a display control unit that generates display data enabling checking of a focusing-degree change state from the past image in units of pixel regions of the current image by using an analysis result of the focusing-degree change analysis unit are provided. Pixel classification information indicating which of (a) pixel approaching focusing, (b) pixel out of focusing, and (c) pixel with no change in a degree of focusing each pixel corresponds to is generated and output in units of pixels.

With this configuration, the device and the method of analyzing a change in the degree of focusing between the current image and the past image and outputting display data capable of identifying a change in the degree of focusing to the display unit are implemented.

REFERENCE SIGNS LIST

100 Imaging device
101 Input unit
102 Control unit
103 Drive unit
104 Image sensor (Imaging element)
105 Focusing-degree change analysis unit
106 Display control unit
107 Display unit
151 Memory
152 First HPF
153 Second HPF
154 Pixel classification unit
201 Pixel-region-basis first HPF output averaging unit
202 Pixel-region-basis second HPF output averaging unit
221 First HPF output down-conversion unit
222 Second HPF output down-conversion unit

The invention claimed is:

1. An imaging device comprising:
a focusing-degree change analysis unit configured to analyze a change in a degree of focusing between a current image output from an image sensor and a past image output from the image sensor before the current image is output;
a display control unit configured to generate display data enabling checking of a focused state from the past image in units of pixel regions of the current image by using an analysis result of the focusing-degree change analysis unit; and
a display unit configured to display the display data,
wherein the focusing-degree change analysis unit, the display control unit, and the display unit are each implemented via at least one processor.

2. The imaging device according to claim 1,
wherein the display control unit generates display data enabling checking of a degree of focusing of the current image and a focusing-degree change state from the past image to the current image.

3. The imaging device according to claim 1,
wherein the focusing-degree change analysis unit generates pixel classification information indicating which of
(a) pixel approaching focusing,
(b) pixel out of focusing, and
(c) pixel with no change in a degree of focusing
each pixel corresponds to in units of pixels, and outputs the pixel classification information to the display control unit.

4. The imaging device according to claim 1,
wherein the display control unit generates display data enabling identification of at least one of a pixel approaching focusing, a pixel out of focusing, or a pixel with no change in a degree of focusing in units of pixels of the current image.

5. The imaging device according to claim 1,
wherein the display control unit generates display data in which a focusing-degree change determination signal enabling identification of at least one of a pixel approaching focusing, a pixel out of focusing, or a pixel with no change in a degree of focusing is superimposed on a through-image that is a developed image of an output of the image sensor.

6. The imaging device according to claim 5, wherein the focusing-degree change determination signal is a color signal that is different in accordance with a focusing-degree change state.

7. The imaging device according to claim 1,
wherein the display control unit generates display data including a bar indicator capable of determining a degree of focusing of a pixel approaching focusing.

8. The imaging device according to claim 1,
wherein the focusing-degree change analysis unit includes
a first filter unit configured to perform filtering processing on the current image and generate current image focusing-degree analysis data enabling identification of a degree of focusing in units of pixels,
a second filter unit configured to perform filtering processing on the past image and generate past image focusing-degree analysis data enabling identification of a degree of focusing in units of pixels, and
a pixel classification unit configured to compare the current image focusing-degree analysis data with the past image focusing-degree analysis data, analyze a change in a degree of focusing in units of pixels or pixel regions, and generate pixel classification information on a basis of an analysis result,
wherein the first filter unit, the second filter unit, and the pixel classification unit are each implemented via at least one processor.

9. The imaging device according to claim 8,
wherein the focusing-degree change analysis unit includes a memory configured to store an output image from the image sensor, and
wherein the second filter unit inputs the past image from the memory and performs filtering processing on the past image.

10. The imaging device according to claim 8,
wherein the first filter unit and the second filter unit
perform filtering processing using a high pass filter (HPF).

11. The imaging device according to claim 10,
wherein a HPF used by the first filter unit and the second filter unit
has a characteristic that an amplitude characteristic increases acceleratively as a frequency approaches a high-frequency side.

12. The imaging device according to claim 8,
wherein the focusing-degree change analysis unit includes
a first filter unit output averaging unit configured to average an output of the first filter unit in units of a plurality of pixels, and
a second filter unit output averaging unit configured to average an output of the second filter unit in units of a plurality of pixels, and
wherein the pixel classification unit is configured to compare an output of the first filter unit output averaging unit with an output of the second filter unit output averaging unit, analyze a change in a degree of focusing in units of pixels or pixel regions, and generate pixel classification information based on an analysis result,
wherein the first filter unit output averaging unit and the second filter unit output averaging unit are each implemented via at least one processor.

13. The imaging device according to claim 1,
wherein the display control unit is configured to output a down-converted image generated by down-converting an output image from the image sensor to the display unit, and
wherein the focusing-degree change analysis unit generates pixel classification information indicating a change in a degree of focusing in units of pixels of the down-converted image.

14. The imaging device according to claim 13,
wherein the focusing-degree change analysis unit includes
a first filter unit configured to perform filtering processing on the current image and generate current image focusing-degree analysis data enabling identification of a degree of focusing in units of pixels,
a second filter unit configured to perform filtering processing on the past image and generate past image focusing-degree analysis data enabling identification of a degree of focusing in units of pixels, and
a down-conversion unit configured to down-convert the current image focusing-degree analysis data and the past image focusing-degree analysis data, and
wherein the first filter unit, the second filter unit, and the down-conversion unit are each implemented via at least one processor.

15. An image processing method performed in an image processing apparatus, the image processing method comprising:
analyzing a change in a degree of focusing between a current image output from an image sensor and a past image output from the image sensor before the current image is output;
generating display data enabling checking of a focused state from the past image in units of pixel regions of the current image by using an analysis result of the analyzed change in the degree of focusing; and
displaying the display data.

16. A non-transitory computer-readable medium having embodied thereon a program, which when executed by at least one processor of an image processing apparatus causes the image processing apparatus to perform image processing, the image processing comprising:
analyzing a change in a degree of focusing between a current image output from an image sensor and a past image output from the image sensor before the current image is output;
generating display data enabling checking of a focused state from the past image in units of pixel regions of the current image by using an analysis result of the analyzed change in the degree of focusing; and
displaying the display data.

* * * * *